F. KRATZ.
JUNCTION BOX FOR ELECTRIC CIRCUITS.
APPLICATION FILED JUNE 5, 1914.
1,180,659.
Patented Apr. 25, 1916.
2 SHEETS—SHEET 1.
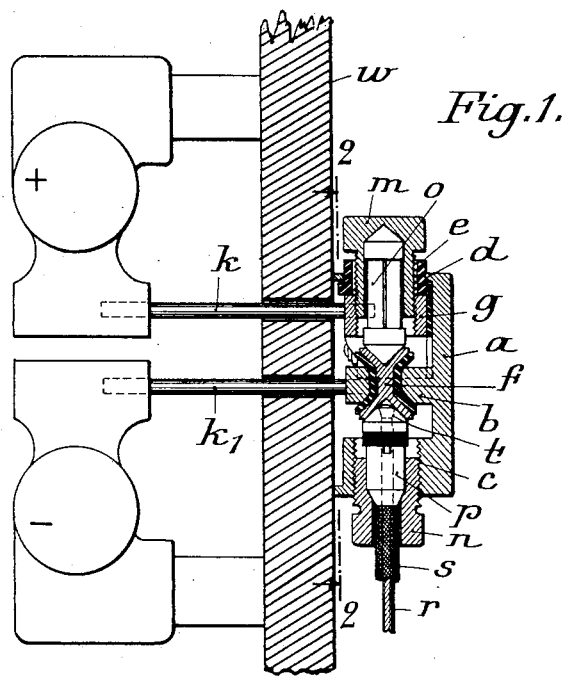
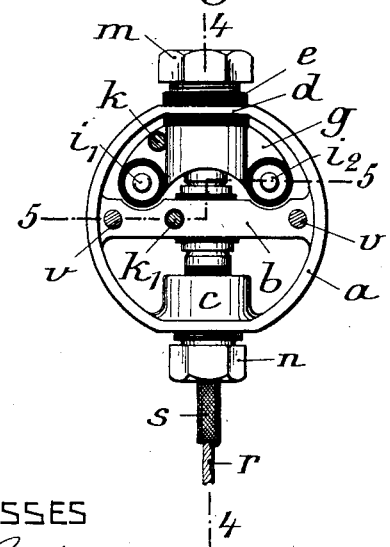
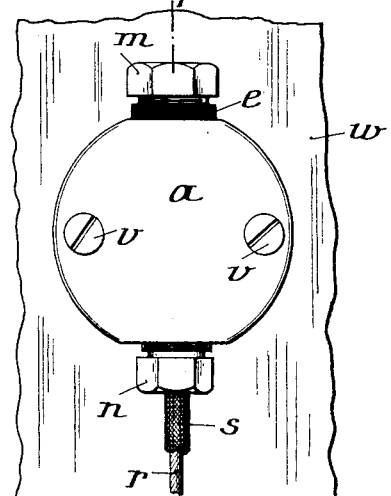
WITNESSES
L. Bates
C. B. Schroeder
INVENTOR
Franz Kratz
By
Pennie Davis Marvin
ATTYS.

F. KRATZ.
JUNCTION BOX FOR ELECTRIC CIRCUITS.
APPLICATION FILED JUNE 5, 1914.
1,180,659.
Patented Apr. 25, 1916.
2 SHEETS—SHEET 2.
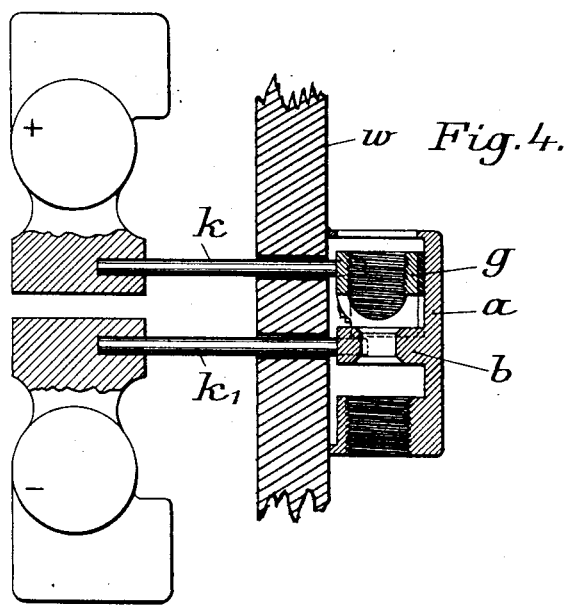
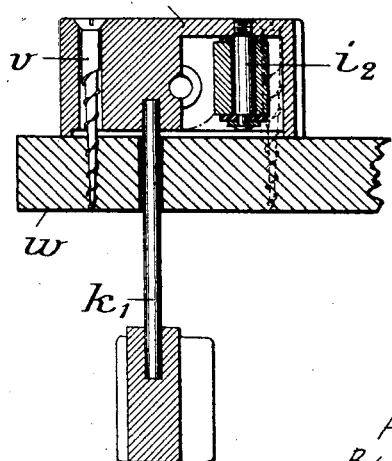

UNITED STATES PATENT OFFICE.

FRANZ KRATZ, OF STUTTGART, GERMANY, ASSIGNOR TO THE FIRM OF ROBERT BOSCH, OF STUTTGART, GERMANY.

JUNCTION-BOX FOR ELECTRIC CIRCUITS.

1,180,659.      Specification of Letters Patent.      Patented Apr. 25, 1916.

Application filed June 5, 1914. Serial No. 843,125.

*To all whom it may concern:*

Be it known that I, FRANZ KRATZ, a subject of the Emperor of Germany, residing at and whose post-office address is Schlosstrasse 59ᴬ, Stuttgart, Germany, have invented certain new and useful Improvements in Junction-Boxes for Electric Circuits; and I do hereby declare the following to be a full, clear, and exact description of the invention, such as will enable others skilled in the art to which it appertains to make and use the same.

The object of the present invention is to provide a fused junction box particularly suitable for electrically connecting two supply conductors to two distributing conductors which, preferably, are in the form of a concentric-conductor cable in which the metal armor of the cable may form one conductor. In using a junction box of this kind with a storage battery, all parts of the junction box including the joints are protected from fumes of the battery, the lead covered connecting wires extending from the battery terminals through the battery box, which is usually of wood, and into the junction box mounted on the outside thereof. The junction box of my invention is simple and compact and embodies a fuse receptacle which may be easily removed for renewal of the fuse and also a connecting arrangement such that the distributing cable may be readily connected and disconnected, all the parts being so securely fastened in place that the continual vibration occurring when the equipment is installed on a moving vehicle does not loosen the connections even after a long period of use.

In the accompanying drawings, illustrating the preferred form of my invention in application to a storage battery having a containing box of wood, as an example, Figure 1 shows a section on line 1—1 of Fig. 3; Fig. 2 shows a section on line 2—2 of Fig. 1; Fig. 3 represents a front view of the junction box; Fig. 4 is a section on line 4—4 of Fig. 2, omitting the distributing cable; and Fig. 5 is a section on line 5—5 of Fig. 2.

The metal housing $a$ of the junction box is closed on one face, and is open on the opposite face which rests against the flat surface of the containing box $w$ for the storage battery. The junction box has a diametrically-disposed metal partition $b$ and is also provided with a screw-threaded socket $c$ on one side of the partition and a flanged opening $d$ on the other side. An abutment member $f$ of metal is inserted through an opening in the partition $b$ and is insulated therefrom as shown. This abutment member has opposed conical contact surfaces. A crescent shaped terminal member $g$ of metal is fastened to the housing by the screws $i_1$ and $i_2$ which are insulated from the member as shown, and the terminal member is further insulated from the housing by means of the insulating sleeve $e$ passing through the hole $d$ in the housing. The fuse receptacle $o$ comprises a cylinder of glass inclosing a fuse of suitable material which is connected to the terminals of the fuse receptacle. The threaded plug $m$ of metal engages the screw threads of the terminal member $g$ to thereby connect the terminal member with one terminal of the fuse receptacle and to maintain the other terminal of the fuse receptacle in contact with the conical surface of the abutment member $f$. The threaded plug $n$ of metal is slipped over the end of a distributing cable having the inner conductor $r$ and the conducting sheathing $s$. The terminal shoe $p$ is connected to the armor of the cable, but is insulated from the tip $t$ which is connected to the inner conductor $r$. By screwing the plug $n$ into place, the armor $s$ of the distributing cable is electrically connected to the housing $a$ of the junction box, and at the same time the core $r$ of the concentric-conductor distributing cable is maintained in electrical contact with the conical surface of the abutment member $f$. The lead covered conductors $k$ and $k_1$ extend from the terminals of the battery and through the battery box $w$ to the terminal member $g$ and the partition $b$ as shown, so that the terminals of the battery are thus connected through the fuse receptacle $c$ to the two conductors $r$ and $s$ of the distributing cable. The junction box is fastened to the container $w$ by screws $v$ passing through the partition $b$.

The current from the battery flows from the positive terminal through the lead covered conductor $k$ into the terminal member $g$ of the junction box, from which it passes through the plug $m$, fuse $o$ and abutment member $f$, into the conductor $r$ of the distributing cable. The current returns by way of the sheathing $s$ of the distributing cable and the terminal shoe $p$, through the plug $n$, metal housing $a$, partition $b$, and conductor $k_1$ to the negative battery terminal.

In installing the junction box on the battery box, the ends of the conductors $k$, $k_1$ are soldered in their receiving holes in the members $g$ and $b$, respectively, and then after the junction box is fastened to the battery box by the screws $v$, the other ends of the conductors $k$, $k_1$ are soldered in the holes in the battery terminals.

The fuse receptacle $o$ may be removed from the junction box by unscrewing the plug $m$, and thus the fuse in the receptacle may be easily renewed; and likewise the distributing cable may be easily removed by unscrewing the plug $n$. However, the fuse receptacle and the distributing cable are normally held securely in place, so that the two terminals of the battery are reliably connected to the two conductors of the cable, in such manner as to withstand severe vibration over an extended period of operation.

Having thus described my invention, what I claim is:

1. In a junction box having two terminals insulated from each other and also having a partition, an abutment member extending through and being insulated from the partition and having opposed contact surfaces, a fuse receptacle, a plug connecting one terminal of the junction box to one terminal of the fuse receptacle and maintaining the other terminal of the fuse receptacle in engagement with one contact surface of the abutment member, and a second plug designed to connect one distributing conductor to the other terminal of the junction box and to maintain another distributing conductor in engagement with the other contact surface of the abutment member.

2. In a junction box having a housing designed to be connected to one supply conductor and also having a partition, a terminal member insulated from the housing of the junction box and designed to be connected to another supply conductor, an abutment member extending through and being insulated from the partition and having opposed contact surfaces, a fuse receptacle passing through said terminal member, a plug connecting the terminal member to one terminal of the fuse receptacle and maintaining the other terminal of the fuse receptacle in engagement with one contact surface of the abutment member, and a second plug designed to connect one distributing conductor to the housing of the junction box and another distributing conductor to the other contact surface of the abutment member.

3. The conbination with a multiple conductor distributing cable, of a junction box having two terminals insulated from each other, an insulated abutment member, a fuse receptacle, a plug connecting one terminal of the junction box to one terminal of the fuse receptacle and maintaining the other terminal of the fuse receptacle in contact with the abutment member, and a second plug connecting one conductor of the cable to the other terminal of the junction box and maintaining another conductor of the cable in contact with the abutment member.

4. The combination with a concentric-conductor distributing cable, of a junction box having two terminals insulated from each other, an insulated abutment member, a fuse receptacle, a plug connecting one terminal of the junction box to one terminal of the fuse receptacle and maintaining the other terminal of the fuse receptacle in contact with the abutment member, and a hollow plug surrounding the cable and connecting one conductor thereof to the housing and holding another conductor thereof in contact with the abutment member.

5. The combination with a concentric-conductor cable, of a junction box having two terminals insulated from each other, an insulated abutment member of metal having opposed conical contact surfaces, a fuse receptacle, a plug connecting one terminal of the junction box to one terminal of the fuse receptacle and maintaining the other terminal of the fuse receptacle in contact with one conical surface of the abutment member, and a hollow plug surrounding the cable and connecting one conductor thereof to the other terminal of the junction box and maintaining another conductor thereof in contact with the other conical surface of the abutment member.

In testimony whereof I affix my signature, in presence of two witnesses.

FRANZ KRATZ.

Witnesses:
PAUL WOLFAST,
REINHOLD ELWERT.

Copies of this patent may be obtained for five cents each, by addressing the "Commissioner of Patents, Washington, D. C."